No. 768,210. PATENTED AUG. 23, 1904.
H. WOLKE.
COMPOUND TURBINE.
APPLICATION FILED DEC. 17, 1903.
NO MODEL.
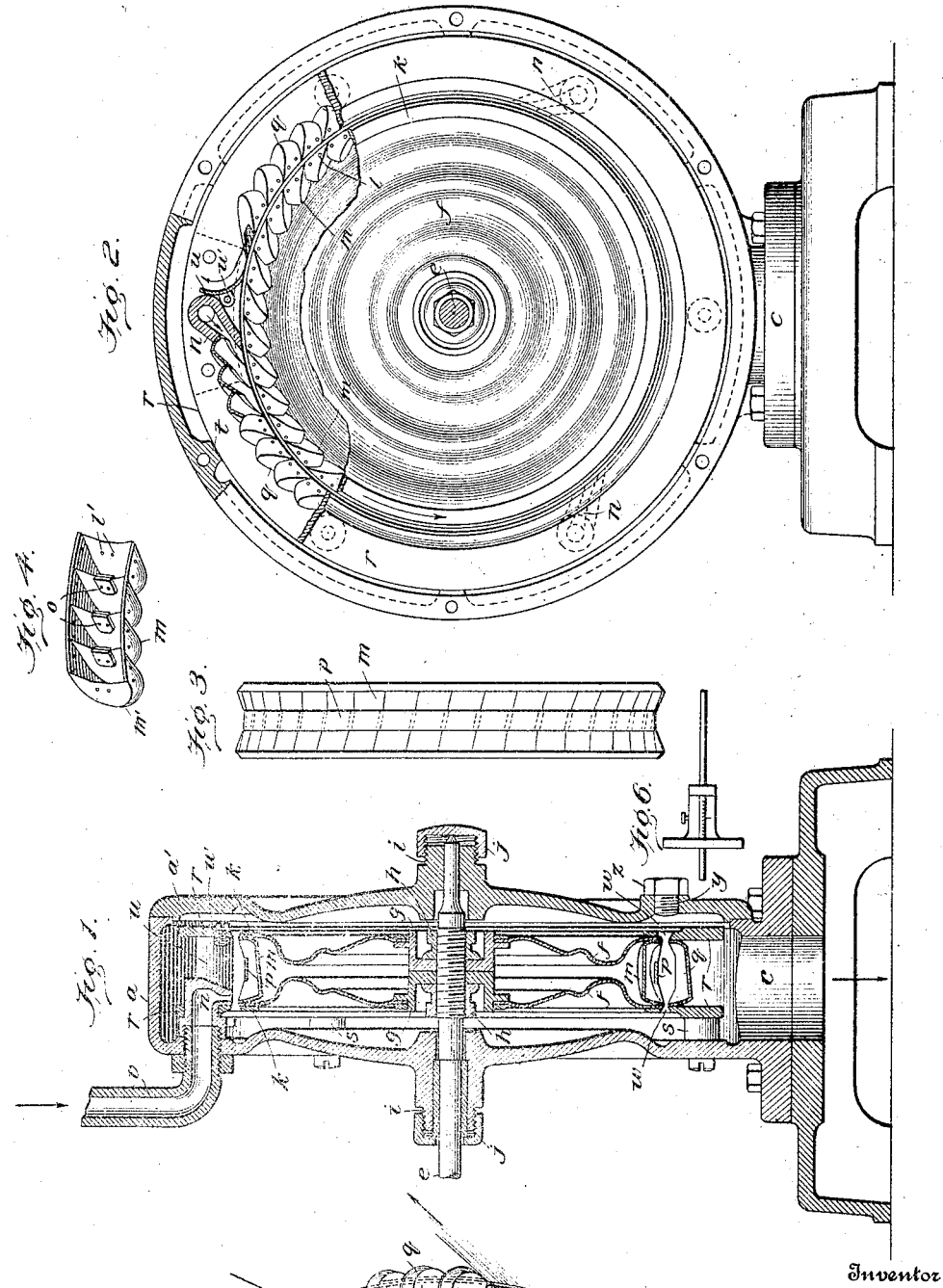
Witnesses
Edwin L. Bradford
J. Granville Myers
Inventor
Herman Wolke
By Davis & Co.
Attorneys No. 768,210.

Patented August 23, 1904.

UNITED STATES PATENT OFFICE.

HERMAN WOLKE, OF NEWARK, NEW JERSEY.

COMPOUND TURBINE.

SPECIFICATION forming part of Letters Patent No. 768,210, dated August 23, 1904.

Application filed December 17, 1903. Serial No. 185,535. (No model.)

*To all whom it may concern:*

Be it known that I, HERMAN WOLKE, a citizen of the United States, residing at Newark, in the county of Essex and State of New Jersey, have invented new and useful Improvements in Compound Turbines, of which the following is a specification.

My invention relates to improvements in compound turbines; and it consists in the novel construction and arrangement of its guide and wheel buckets, the object of which is to give to a freely-escaping vapor or steam jet after leaving the nozzle under pressure and with high velocity an extended and comparatively circular and helical path in which the kinetic energy of the circulating fluid manifesting itself as centrifugal force is compelled to exert this force as so much pressure in the moving direction of the buckets of the rotating wheel, transforming in this manner the inherent and available energy of the vapor-current into further utilizable mechanical power to the wheel-shaft of the turbine. The application of this system provides a motor which is capable of fully utilizing the available energy of the steam in a very economical way at either high or low speeds, permitting a convenient variation of the turbine-wheel velocities at fixed rates of boiler-pressure, thus always giving under many varying conditions desirable equivalent results. These and other improvements pertaining to the construction and operation of this motor are attained by such devices as illustrated in the accompanying drawings, in which—

Figure 1 is a vertical cross-section of the turbine-motor. Fig. 2 is a side elevation with a portion of the cover of the casing broken away to disclose the interior of the turbine and the relative position of the wheel and counter buckets. Fig. 3 is a peripheral elevation of the power-wheel. Fig. 4 is a detail perspective of wheel-buckets. Fig. 5 is a detail perspective of wheel and counter buckets, showing the helical course of the power-current. Fig. 6 is a gaging device used in bringing the wheel to its proper position.

A turbine-wheel has its power-transmitting shaft $e$ journaled in centrally-located bearings of an air-tight casing. Said bearings, which project from the casing, have threaded ends $i$, that hold nuts $j$ for adjusting the shaft and wheel to correct position within the casing. The turbine-casing is formed of two parts, the body $a$ and its cover $a'$, said casing being also provided with a suitable steam-outlet, the hollow foot $c$ of the casing, which is bolted to a suitable base, serving in this motor for that purpose. The principal parts of the turbine-wheel, as shown in Figs. 1, 2, and 3, are composed of a ring of wheel-buckets. This bucket-ring is suitably fastened between two wheel-disks $ff$ of the same diameter as the bucket-ring. The wheel-disks are provided with central hub-pieces $g$ $g$, that are clamped and fastened to a threaded wheel-shaft $e$ by means of nuts $h$ $h$. Said disks are made of any suitable sheet metal and are dished out and otherwise provided with concentric ribs in a manner which is intended to combine lightness with strength. Flat rings $k$, fastened, by means of rivets $l$, to the outer face at the circumference of these disks, serve to further increase the strength and rigidity of the turbine-wheel. The turbine-buckets $m$, which occupy the peripheral space between the wheel-disks, are shown in form and position in Figs. 1, 2, 3, 4, and 5. The form of the inner space of each bucket is determined on each of the two opposing parallel or nearly-parallel sides by a flat surface approximately semicircular in outline, the semicircular edges of which flat surfaces join at right angles with the face of an appropriately semicircular curved wall in such a manner as to form a flat pocket, of which the cross-section of the bottom segment shows the three joined faces in a U-shaped and rectangular position to each other, as shown in Figs. 2, 4, and 5. These flat and semicircular-formed buckets project with their bottom ends, which overlap each other, as shown in Fig. 2, from the wheel's periphery toward the interior of the wheel in a tangential direction. Besides this these buckets take also an oblique position between the turbine-disks, which make their open ends rhomboidal in outlines, as shown in Fig. 3. These buckets after having been formed to the proper shape are riveted directly to each other and to the wheel-disks, the holes $l'$ serving for the rivets. To make a stronger union at the junction of two adjoining buckets, plates $o$ may be additionally attached with the binding-rivets, Fig. 4. For increasing strength and to diminish any fanning action of the buckets I prefer to surround the whole series with a tight-fitting band $p$, let into recesses in the bucket edges, Figs. 1 and 3.

Surrounding, coinciding, and closely approaching but not touching the periphery of the turbine-wheel are two stationary rings $r$, holding between them a series of closely-adjoining, outwardly-overlapping, and inwardly-open counter-buckets $q$. These buckets resemble in construction the wheel-buckets, but in regard to tangential direction and axial inclination take a directly opposite position to them, Figs. 2 and 5. This counter-bucket ring is secured to the casing by studs $s$, Fig. 1. The inner periphery of the casing is provided with several projections $t$, against which the rings $r$ bear when fitted in place. This arrangement limits the contact and corresponding heat conduction with the casing to a few points and permits the free circulation of any fluid between the rings and casing on its way to the outlet. Instead of a full ring only a part or several parts of such a ring may be employed, according to service required.

The buckets of the turbine-wheel and the oppositely-coinciding counter-buckets, each representing a series of sloping semicircular pockets, form in combination with each other a confined helical channel composed of obliquely-placed overlapping spiral rings or loops whose axis surrounds the turbine-wheel and is centrally located between the wheel and counter buckets, Figs. 2 and 5. The outside edges of the obliquely-crossing walls that form the flat sides of the buckets are not straight, but retreat in a curved or broken line in the middle of the periphery a little distance toward the interior of said buckets. This particular form is provided centrally with an open space between the wheel and counter buckets, forming thus an unobstructed channel surrounding the middle of the periphery of the wheel about which the joined and continuous grooves formed by the pockets of the wheel and counter buckets makes its helical turns, Figs. 1, 2, and 5.

The buckets of the revolving wheel receive tangentially at one side and in the rotating direction of the wheel a freely-moving steam-jet issuing from a nozzle $n$, suitably placed between the bucket-supporting rings $r$ and connected with a supply-pipe $v$, entering through the turbine-casing, Figs. 1 and 2. I refer here to steam as the acting medium; but it should be understood that any other fluid in a liquid or vaporized state could be used as well. The straight-lined jet of the delivered steam entering the turbine-buckets with great velocity and traveling many times faster than the circumferential speed of the wheel is compelled to glide around at the inner peripheral face of the curved bucket-wall, imparting to the wheel during this process through the impinging pressure of the enforced centrifugal action of the power-current an equivalent amount of mechanical energy until, with the remaining kinetic energy and in a completely-reversed direction, (which amounts to one hundred and eighty degrees,) it escapes at the opposite end of the wheel-bucket. The steam having after this lost only a fraction of its initial velocity is now tangentially and without shock or disturbance caught by the coinciding counter-buckets, which reversely deflect, helically advance, and tangentially guide it back again into the rotating wheel-buckets to impart another propulsive impact to the wheel. In this manner the centrifugal force of the spirally-whirling steam will with every turn in its helical course impart with respect to its remaining kinetic energy a corresponding driving pressure to the wheel and continues this as long as the velocity of the steam is sufficiently high to overtake the rotating wheel-buckets. By lowering the wheel's velocity its relative mechanical efficiency will still be maintained and manifest itself in that much-increased torsional pull or pressure at the wheel-shaft, for the slower the wheel is rotating the more spiral turns and effective impulses the steam will have to make. The number of these impulses will also bear a definite relation to the pressure at which the fluid is ejected from the nozzle. To assure an even compact flow and an effective centrifugal action of the steam, it is important that the inner peripheral faces of the semicircular bucket-walls at the bottom sections of all the buckets take a perpendicular position to the radial lines of the centrifugal action of the circulating fluid. To avoid other injurious resistance to the motive fluid, the obliquely-crossing bucket-walls are brought to a sharp edge near the steam-entering side of all the buckets. The acting steam will pass freely without essential loss over the clearance between the wheel and counter buckets, and for properly gaging the proper wheel position to insure an unobstructed steam-passage from one bucket to another a depth-gage, Fig. 6, may be inserted through the gaging-hole $y$ in the casing and brought to bear against the ring and wheel-faces to facilitate the necessary adjustment. Ordinarily the gaging-hole is closed with a tight-fitting screw $z$. It is also of importance that the natural driving pressure imparted to the wheel-buckets by the ejected steam should be in a linear direction to the wheel's rotation without causing any end pressure to the latter. For this reason the curved bucket-wall of the wheel-buckets instead of making a true semicircle is curved on a greater radius at the steam-receiving end and merges toward the delivering end into an arc of smaller radius, as shown at $m'$ in Fig. 4. The curved walls of the counter-buckets in order to make a more effective steam-delivery are of greater radius at their ejecting ends than at their receiving end. After the work-performing energy of the circulating steam has all been absorbed and transferred into mechanical power it is, having all its former inherent velocity lost, no longer able to follow the original prescribed helical path, but being exhausted and in an inert condition it is driven into and flows along the peripheral channel centrally located between the wheel and counter buckets. This takes the exhausted steam virtually out of the way of the turbine-buckets, with whose action it will not be able to interfere in any manner after this.

At any distance from the nozzle in the counter-bucket ring sufficiently long to provide the required number of helical turns for the steam to use up its kinetic energy an open space produced by the omittance of some counter-buckets is provided. Fitted into this space between the bucket-bearing rings $r$ is a curved diverting-plate $u$, fastened to the rings $r$ by rectangular bent extensions $u'$, Figs. 1 and 2, in such a position that will divert the oncoming exhaust-steam from between the wheel and counter buckets and direct the same through the provided opening into the free space within the casing, from where it flows farther to the steam-outlet.

The closely-approaching coinciding circumferential edges of the counter-bucket rings and wheel-disks are beveled off toward the outside, as shown at $v$ in Fig. 1, which brings the adjoining peripheral faces to minimum proportions and prohibits any retarding influence or fluid friction that might be occasioned at these points.

The jet-nozzle should be formed to give to the discharged fluid a high initial velocity, or its shape might be such that would permit the full expansion with the resulting increased velocity of the steam before it enters the wheel-buckets; but the helical steam-path in this motor is well adapted to give the ejected steam the best opportunity to effectively expand to its fullest extent, which on account of its great velocity and the inherent inertia can only take a forward direction, which tends to accelerate this velocity yet to a certain degree after it has entered into the buckets.

Instead of having one nozzle only this motor may be constructed with a number of them, in which case the necessary distance required for the helical steam-path between them should be considered. With all the elements known for maximum efficiency a motor with but a few idle buckets may be constructed, although a reasonable number of such idle buckets will have no detrimental effect in this machine.

Instead of having the buckets placed at the wheel's periphery they might also be set in the sides of the same, or the ring might be made to rotate while the inner buckets serve as stationary counter-buckets.

I do not limit myself to the details of construction herein described, and shown in the drawings, as I desire to avail myself of such modification and equivalent as fall properly within the spirit of my invention.

Obviously the design may be carried to such a point that even while the bucket-wheel is entirely at rest the acting fluid is compelled to completely exhaust itself between the wheel and counter buckets, transferring in this case all its available energy through the subsequent greatly-multiplied number of impulses to the power-absorbing wheel, in this manner generating a highly-increased pressure, which will be of great importance in starting machinery from a dead load.

Having thus far described my invention, what I claim as new, and desire to secure by Letters Patent, is—

1. A turbine wheel-bucket whose inner form of space is determined on two opposing sides by flat-faced walls that join at the closed and curved end of the bucket to a wall whose longitudinal curve is of greater radius at the steam-receiving end than at the delivery end.

2. A turbine counter-bucket whose inner form of space is determined on two opposing sides by flat-faced walls that join at the closed and curved end of the bucket to a wall whose longitudinal curve is of less radius at the steam-receiving end than at the delivery end.

3. In a power-turbine, containing a rotating wheel and a series of counter-buckets, the transversely-extending bucket edges at the periphery of the wheel retreating in a curved or broken line toward the interior of the buckets, forming a concaved wheel periphery, which in combination with the counter-buckets, provide a circumjacent free space or channel between and in the middle of the wheel and counter-buckets.

4. In a power-turbine, containing a rotating wheel and a series of counter-buckets, the transversely-extending bucket edges at the interior periphery of the series of counter-buckets retreating in a curved or broken line toward the interior of the buckets, forming a concaved inner periphery of the counter-buckets, which, in combination with the wheel's periphery, provides a circumjacent free space or channel between and in the middle of the wheel and counter-buckets.

5. In a power-turbine containing a rotating wheel and a series of counter-buckets, the wheel and counter-buckets having between them a centrally-located free channel, circumjacent to the wheel, a diverting-plate projecting into said channel for the purpose of guiding the exhaust-steam from between the wheel and counter-buckets.

6. A power-turbine, comprising a casing having a series of stationary buckets and being provided with threaded bearings holding adjusting-nuts, a rotary wheel mounted on an adjustable shaft journaled in the casing, said casing being provided with a gaging-hole for admittance of a gaging device, such to be used in combination with the adjusting-nuts for the correct setting of the wheel.

7. A turbine-motor comprising a casing having a series of guiding or counter buckets with retreating transverse bucket edges and means for admitting fluid under pressure, a power-absorbing bucket-wheel journaled in the casing whose transverse bucket edges also form a retreating line, the wheel and counter-buckets coinciding with each other and guiding the incoming power fluid in progressive spiral rings, the central portion of the circulating-fluid rings constituting an unobstructed channel that surrounds the wheel's periphery.

8. A turbine-motor, comprising a casing, a bucket-wheel journaled in the casing, the wheel-buckets being held between disks and coinciding with guide-buckets held between rings, the transverse bucket edges of all the buckets at their open faces forming a retreating line, and the approaching coinciding circumferential edges of the counter-bucket rings and wheel-disks being beveled off toward the outside, thus bringing the closely-approaching faces of the stationary and moving parts to minimum proportions.

9. In a power-turbine, a casing, a wheel carrying buckets, the inner form of space of each bucket being determined on opposing sides by flat walls that join at the closed and curved end of the bucket to a wall whose longitudinal curve is of greater radius at the steam-receiving end than at the delivery end, and a series of counter-buckets, the inner form of which is determined on two opposing sides by flat walls that join at the closed and curved end of the bucket to a wall whose longitudinal curve is of less radius at the steam-receiving end than at the delivery end.

In testimony whereof I have signed my name to this specification in the presence of two subscribing witnesses.

HERMAN WOLKE.

Witnesses:
MARY A. DAVIS,
HATTIE A. DAVIS.